Figure 1:
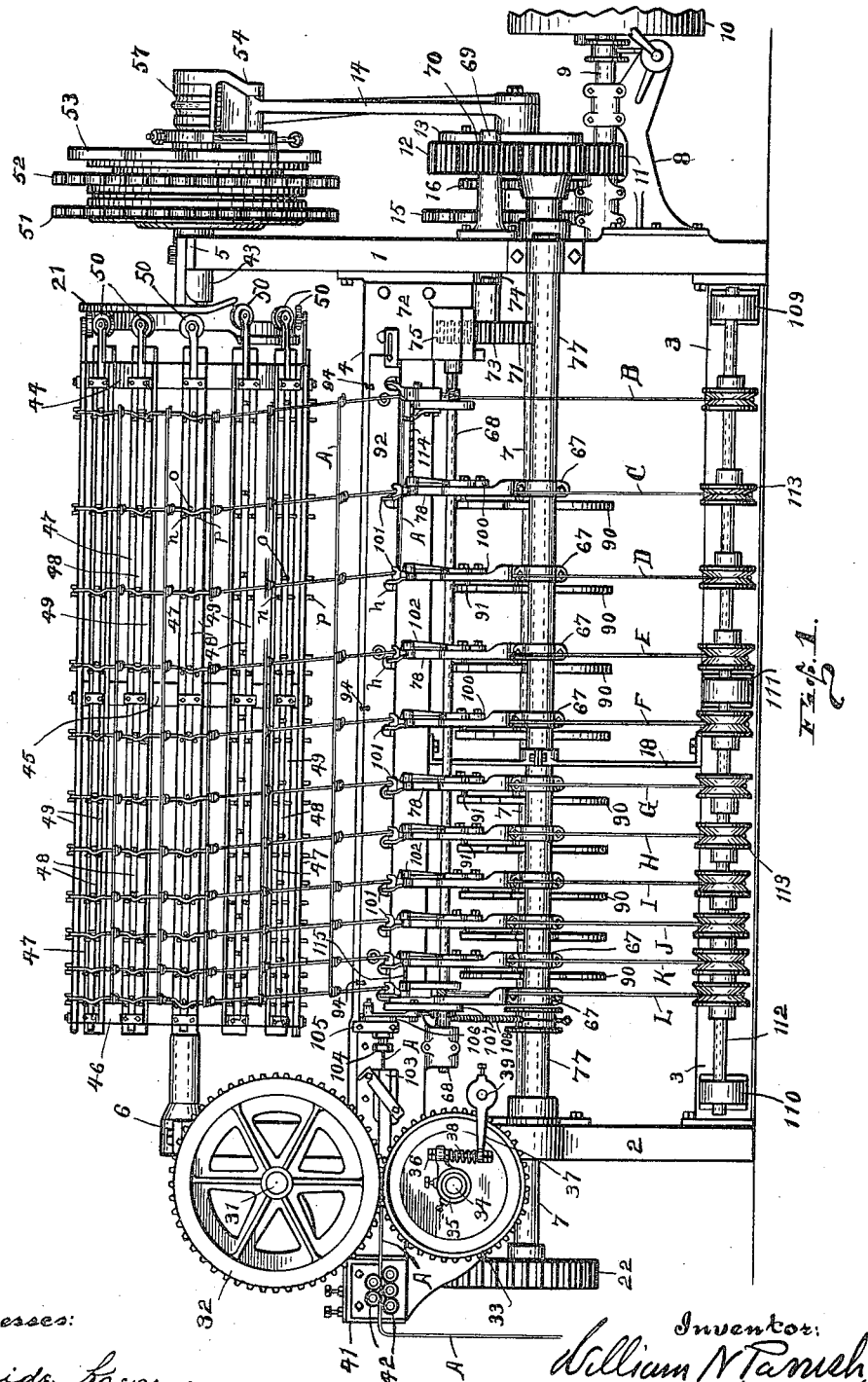

W. N. PARRISH.
WIRE FENCE MACHINE.
APPLICATION FILED SEPT. 9, 1912.

1,075,374.

Patented Oct. 14, 1913.

6 SHEETS—SHEET 1.

Witnesses:
Adelaide Kearns
R. E. Randle

Inventor:
William N Parrish
By Robert W Randle
Attorney.

W. N. PARRISH.
WIRE FENCE MACHINE.
APPLICATION FILED SEPT. 9, 1912.
1,075,374.
Patented Oct. 14, 1913.
6 SHEETS—SHEET 2.
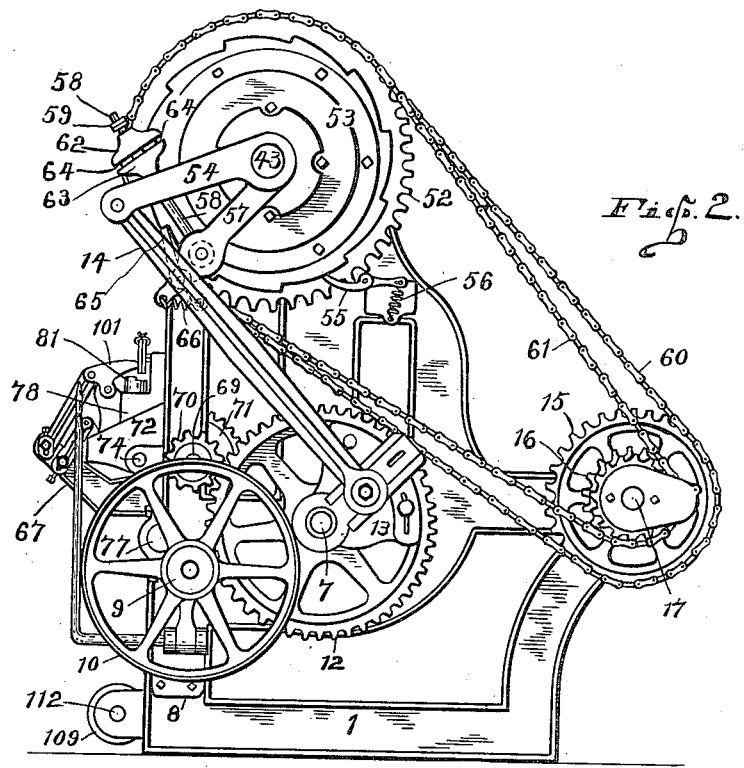
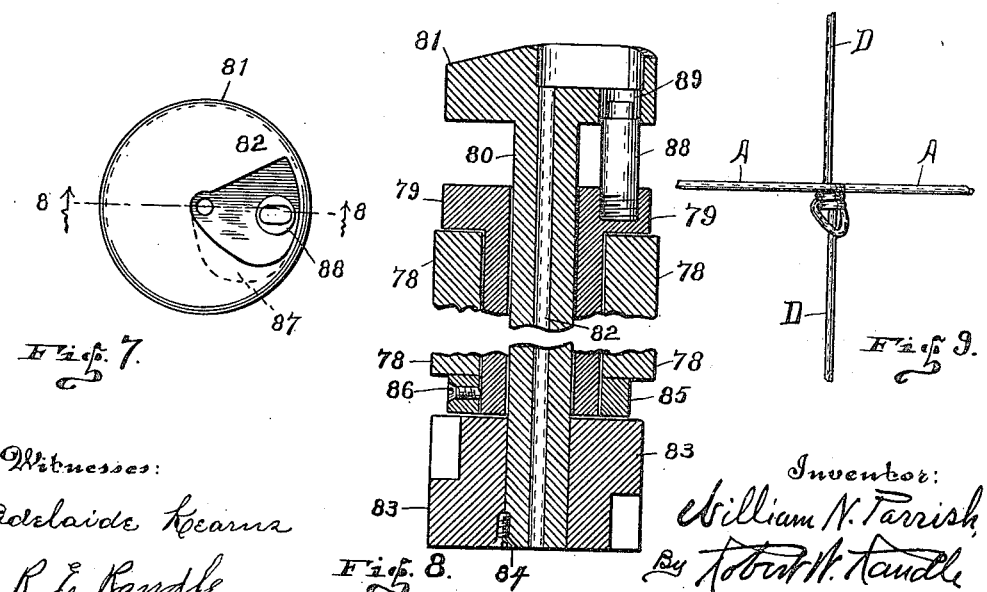
Witnesses:
Adelaide Kearns
R. E. Randle
Inventor:
William N. Parrish,
By Robert W. Randle
Attorney.

W. N. PARRISH.
WIRE FENCE MACHINE.
APPLICATION FILED SEPT. 9, 1912.
1,075,374.
Patented Oct. 14, 1913.
6 SHEETS—SHEET 3.
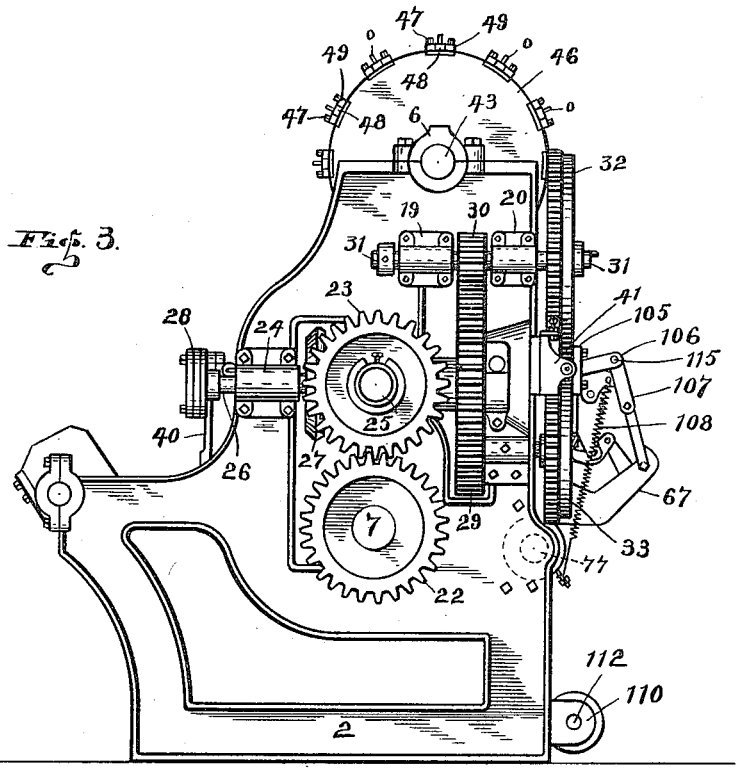
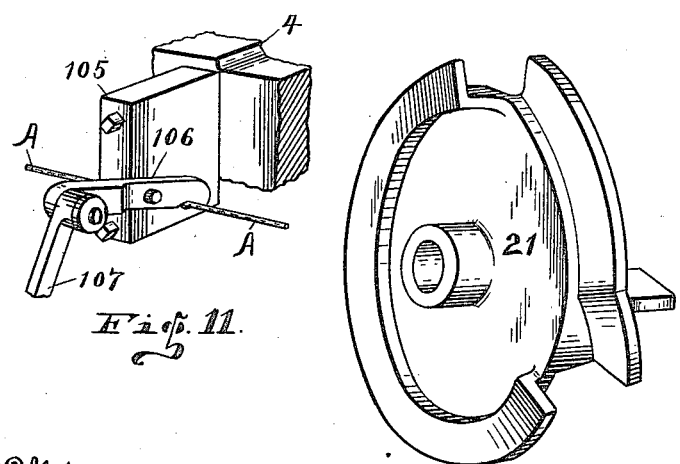
Witnesses:
Adelaide Kearns
R. E. Randle
Inventor:
William N. Parrish
By Robert W. Randle
Attorney

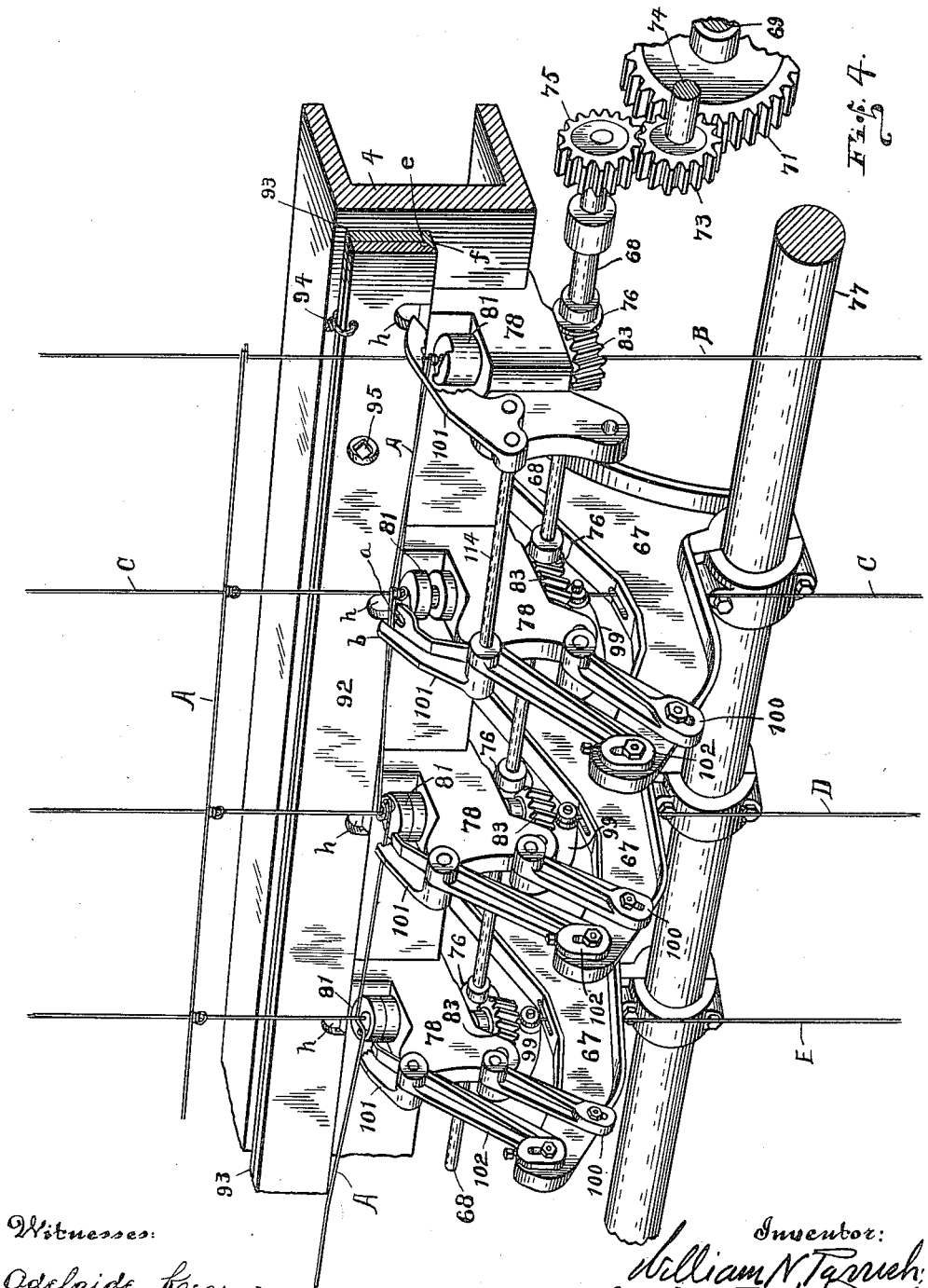

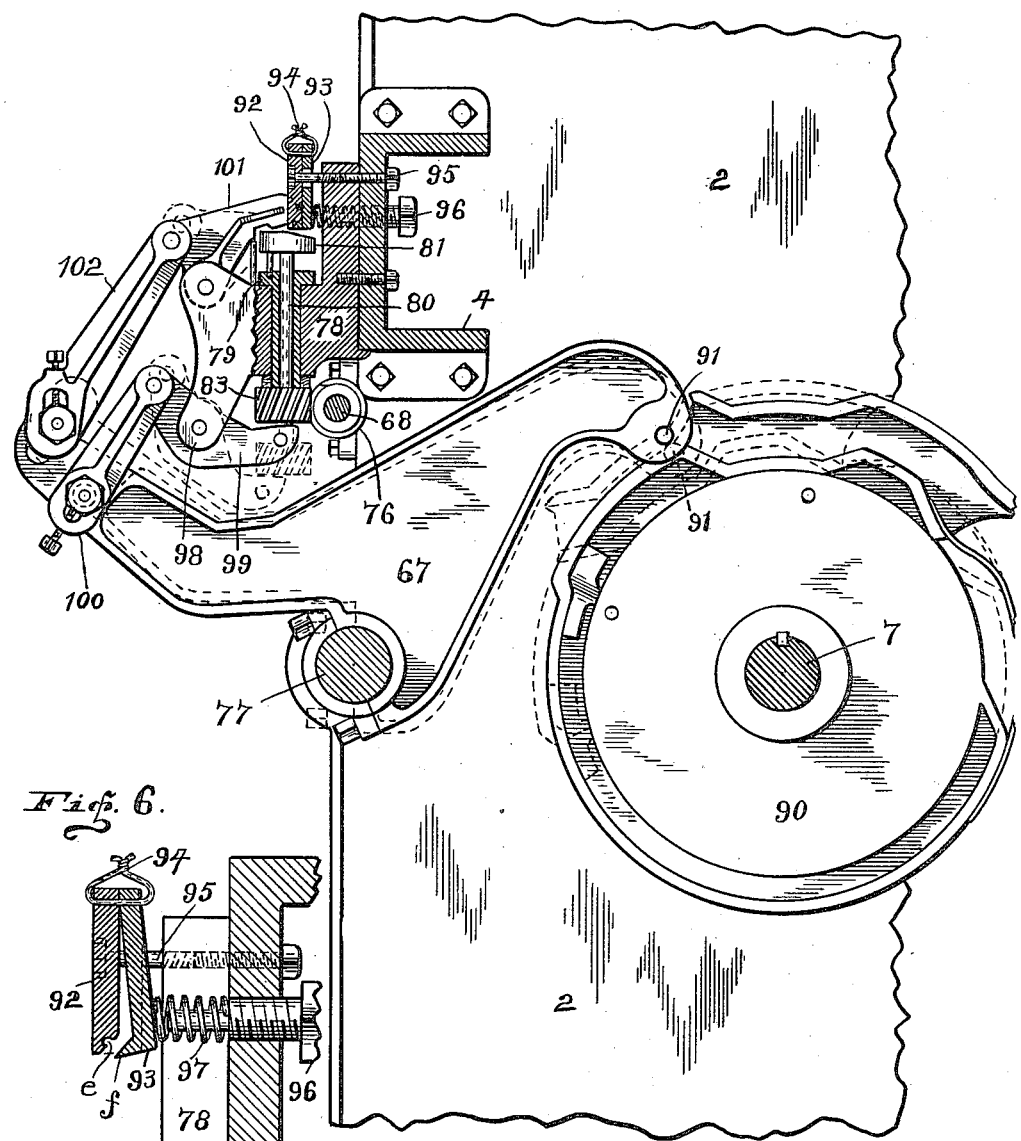

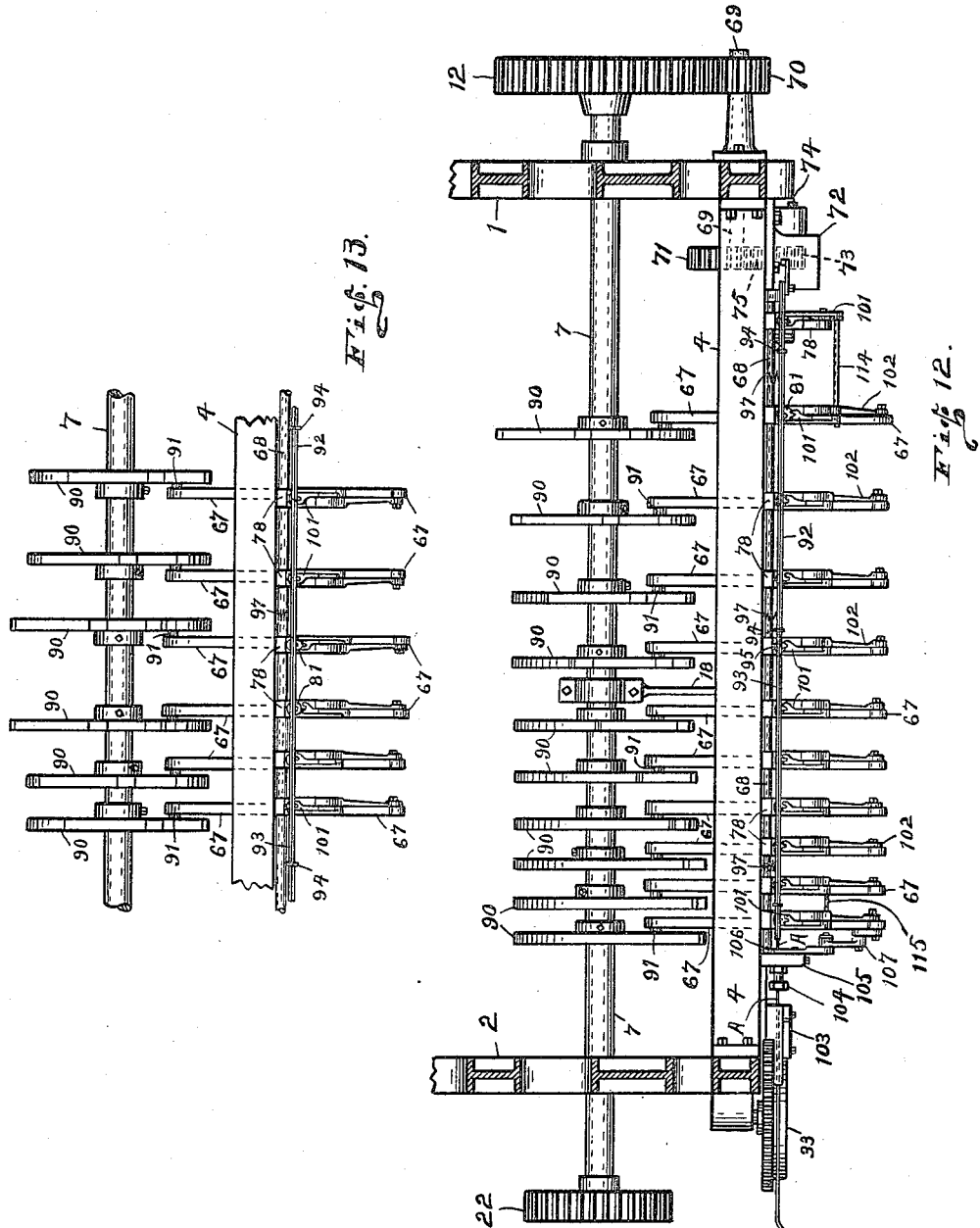

UNITED STATES PATENT OFFICE.

WILLIAM N. PARRISH, OF RICHMOND, INDIANA.

WIRE-FENCE MACHINE.

1,075,374.  Specification of Letters Patent.  Patented Oct. 14, 1913.

Application filed September 9, 1912. Serial No. 719,429.

*To all whom it may concern:*

Be it known that I, WILLIAM N. PARRISH, a citizen of the United States, residing in the city of Richmond, in the county of Wayne and State of Indiana, have invented certain new and useful Improvements in Wire-Fence Machines, of which the following is a true and comprehensive specification and exposition, being such as will enable others familiar with the art to make and use the same with absolute exactitude.

The object of my present invention is to provide a wire-fence machine or loom which will be automatic in operation, strong and durable in construction, easily operated and controlled and which can be manufactured and sold at a comparatively low price, at the same time providing a machine adapted to complete a maximum amount of finished product in a minimum amount of time and to deliver the same with absolute precision.

The present invention relates to a machine adapted to employ both line and stay-wires, drawing all continuously from constant sources of supply and weaving the same into a fabric having meshes of a trapezoid, or parallelogram, or square, shape and continuing the operations continuously and automatically.

The specific objects and the particular advantages of my present machine will be brought out and made apparent in the course of the following specification, and that which is new and useful therein will be correlated in the claims.

In carrying out the general scheme of this invention, a great variety of mechanical principles are involved, all of which are necessary to the successful operation of the machine as an entity; therefore the several parts are arranged in progressive succession, whereby a predetermined result is accomplished by all of the several elements operated from a single source of power.

The preferred manner, for the accomplishment of the best results, and that which I have determined to be the most practical, is shown in the accompanying drawings, in which—

Figure 1 is a front elevation of my machine. Fig. 2 is an elevation of the right-hand end of the machine. Fig. 3 is an elevation of the left-hand end of the machine. Fig. 4 is a detail view of a portion of the bed-plate and certain of the twisters carried thereby, and certain other parts which coact with said twisters. Fig. 5 is an enlarged detail view showing one of the intermediate finger mechanisms and the means by which it is adapted to be operated and its relation to a twister. Fig. 6 is a detail cross section of the tracker-bar, open, and showing the connection of the tracker-bar to the bed-plate. Fig. 7 is a plan view of the face of one of the heads. Fig. 8 is a detail central section taken vertically through one of the twisters. Fig. 9 is an enlarged view of one of the ties. Fig. 10 is an isometrical view of the cam for the bulldozer. Fig. 11 is a detail view of the cutter. Fig. 12 is a plan view of the cam-wheel and the cam-arms, showing the relative positions of one to the other. And Fig. 13 is a detail view similar to Fig. 12, but showing a slight modification, wherein the central twisters operate first and after that the operations are to the right and to the left, while in Fig. 12 the timing is shown such that all of the twisting operations will be from right to left.

Similar characters designate like parts throughout the several views of the six sheets of drawings.

In the drawings the numeral 1 designates the right and 2 the left end members of the main-frame of the machine, by which the various parts are supported, said members being connected by suitable cross members— as, for instance the member or tie 3, which is located at the lower front corner, carrying the tension devices, and the member 4, located centrally of the front of the machine, forming the bed-plate for carrying some of the principal devices of the machine, as hereinafter set forth.

Numeral 7 denotes the main shaft, the same being mounted in suitable boxings carried by the main frame, and it is located below and to the rear of the bed-plate 4, and it extends through and beyond the members 1 and 2 for manifest reasons. Mounted on the outer face of the lower forward portion of member 1 is the bracket 8 which carries the shaft 9, on which latter is mounted the pulley 10. Said pulley 10 is adapted to be thrown into and out of gear, and through it power may be applied to operate the machine. Said shaft 9 carries a pinion 11 which meshes with the large gear-wheel 12, the latter being secured on the shaft 7. Adjustably secured on the face of the gear wheel 12 is the plate 13 which carries an adjustable axle on which is mounted the lower end of the arm 14. The two sprocket wheels 15 and 16 are mounted on the stub-shaft 17 carried by the rearwardly projecting portion of member 1, as shown in Fig. 2, and they will be further mentioned hereinafter in connection with the reel mechanism. Connecting the member 3 and the bed-plate 4, near the center of the machine, is the hanger 18, which carries a boxing in which operates the center of the shaft 7. Mounted on the left-hand end of shaft 7 is the gear wheel 22 which meshes with the gear wheel 23, the latter having a miter-gear, (not shown) formed integral with its inner face and concentric therewith, and meshing with the corresponding miter-gear 27, Fig. 3. The gear wheel 23 is revolubly mounted on the axle-stem 25. Mounted in boxing 24, carried by the face of member 2, is the short-shaft 26 which is located at right-angles to shaft 7, and it is located on same plane as is the stem or axle 25. Mounted on the central portion of shaft 26 is the said miter-gear 27. Mounted on the rear end of shaft 26 is the peripheral adjustable cam 28, for a purpose hereinafter shown. Mounted on the forward end of shaft 26 is the large gear wheel 29.

Numeral 30 designates a pinion which is located above and meshes with the gear wheel 29, and said pinion 30 is secured on the shaft 31, the latter being carried in the boxings 19 and 20, said boxings being secured to the face of end-member 2, as in Fig. 3. Secured on the forward end of shaft 31 is the major stay-wire-shooting wheel 32, one portion of whose face is provided with gear-teeth while the other portion thereof is plain.

The minor stay-wire-shooting wheel 33 is smaller in diameter than wheel 32 directly below which it is located. One portion of the face of wheel 33 is provided with gear-teeth while the other portion is plain. The teeth of the two wheels 32 and 33 are at all times in mesh with each other, although the plain faces of the two wheels are adapted to be moved slightly toward and away from each other, for the purposes hereinafter explained. Said minor wheel 33 is revolubly mounted on the stud 34 by means of the eccentric 35 which latter when slightly turned on the stud 34 will raise or lower the wheel 33, in order that the stay-wire material may be clamped between the faces of the two wheels 32 and 33, or released as desired. Said eccentric 35 has an extension or finger in which is an eye through which is loosely disposed the bolt 36. Said bolt extends down through the finger 37. There is a head or nut on each end of said bolt above and below the eccentric and said finger, respectively. Coiled around said bolt 36 and normally forcing the fingers apart is the helical spring 38. Said finger 37 is secured on the forward end of the bar 39. Secured on the rear end of bar 39 is the arm 40 which has a roller on its upper end adapted to travel on the periphery of the cam 28, whereby as the cam revolves the smooth faces of wheels 32 and 33 will be alternately moved toward and from each other a predetermined amount.

Carried by the forward portion of end member 2, and the bed-plate 4, and projecting to the left, is the guide-plate 41, the outer portion of which carries double rows of rollers 42, which are staggered with relation to each other, between which the stay-wire material travels, passing through a channel formed in the guide-plate 41, the same being located in alinement with the peripheral contact point of the wheels 32 and 33, as shown in Fig. 1.

Numeral 43 designates the shaft of the bulldozer, the same being mounted in suitable boxings 5 and 6 located on the upper ends of the respective members 1 and 2, as shown in Fig. 3. Secured on the shaft 43 are a plurality of comparatively large disks, 44, 45 and 46, for instance. Located adjoining each other side-by-side are a plurality of sets of bars, the members of each set consisting of the bars 47, 48 and 49. Each set of bars is spaced some distance apart from the sets next thereto. The two outermost bars of each set, that is bars 47 and 49, are rigidly secured to the peripheries of the disks 44, 45 and 46, while the other, bar 48, is mounted to slide endwise between the other two. Mounted on the right-hand end of each of the bars 48 is a roller 50, which rollers are adapted to contact with the fixed cam 21. The comparatively large drum which is formed by the construction just described forms what is termed the bulldozer, a further description of which will hereinafter be set forth. Mounted on shaft 43, to the right of member 1, are the two frictional contact sprocket wheels 51 and 52, and connected therewith is the ratchet disk 53. Mounted on the outer end of the shaft 43 is the arm 54 to the outer end of which is pivoted the arm 14.

Numeral 55 refers to a pawl operative on the ratchet 53, said pawl being held in contact with the ratchet by means of the spring 56. Also secured on shaft 43 is the arm 57. Pivoted on the outer portion of arm 57 is the rod 58 which passes through an aperture formed therefor in the arm 54, the outer end of said rod being threaded and provided with the nuts 59. The sprocket wheels 51 and 15 are connected by the chain 60, while the sprocket wheels 52 and 16 are connected by sprocket-chain 61, the purpose of these wheels being to operate the reel which will hereinafter be fully explained. The two jaws 62 and 63 operate loosely on the rod 58, and one of said jaws contacts with the arm 54 and the other with the nuts 59, and the two jaws are held resiliently apart by one or more cushions 64, formed of rubber or other material. Pivoted on the arm 57 is the dog 65 which is held resiliently in place by the coil-spring 66.

Extending across the front of the machine, located below the bed-plate 4, forward of and on same plane as the shaft 7, is the fixed shaft 77, same being carried in suitable hangers secured to the forward portions of the end members 1 and 2. The central portion of shaft 77 is supported by the standard 18. Rotatably mounted on shaft 77 are a plurality of rocking cam-arms 67, shown most plainly in Fig. 5, there being one for each line wire of the fence to be formed.

Numeral 68 denotes the twister shaft, the same being rotatably mounted by hangers extending down below the bed-plate, said shaft 68 being located directly below the forward edge of the bed-plate. Mounted in a suitable boxing carried by the forward central portion of the end member 1 is a stub-shaft 69, to the right-hand end of which is secured the pinion 70, the latter being in mesh with the gear wheel 12. Secured on the left-hand end of shaft 69 is the driven-gear 71. Secured to the front of the right-hand portion of the bed-plate is a housing 72 in which is mounted the idle pinion 73, the latter having a staff 74 on which it revolves. Mounted on the right-hand end of shaft 68 is the pinion 75. From the above it is apparent that as the wheel 12 revolves that the twister-shaft 68 will be turned by means of the intervening gears and pinions, and that at the desired speed. Secured to shaft 68 are a plurality of spiral pinions 76, one for each line-wire of the fence, the same being spaced according to the spacing of the line-wires in the fence to be made.

Secured to the face of the bed-plate 4, and extending forward and downward therefrom, are the twister-blocks 78, one for each line-wire. Formed vertically through each twister block 78 is a round aperture in which snugly operates a twister mechanism. Each twister is substantially as that shown in Fig. 8, and includes a hollow thimble 79 having an upper flange, extending out at right angles onto the top of the block, preventing the thimble from dropping down through said aperture in the block in which it is fitted, but allowing it to revolve in its aperture. Revolubly mounted in the thimble 79 is the stem 80, the same being free to move up and down within its thimble as indicated. Formed integral with the upper end of the stem 80 is the head 81. Extending centrally through the stem 80 and the head 81 is a line-wire channel 82, through which the line wire supply may pass upward, as will hereinafter be fully explained. Secured on the lower end of and concentric with the stem 80 is the spiral pinion 83. Each of the spiral pinions 83 meshes at right-angles with one of the corresponding spiral pinions 76. The spiral gear 83 is secured to the stem 80 by a screw 84, as shown in Fig. 8.

Numeral 85 denotes a collar secured around the lower portion of the thimble 79, immediately below the lower face of the block 78, as shown, the same being secured by the screw 86 as shown.

The upper face of the head 81 is formed oval, and in one side of said face is formed a triangular cavity 87, into the vertical portion of which enters the channel 82, as shown in Fig. 7.

Numeral 88 denotes a pin secured in the upper face of the thimble 79 and projecting upward therefrom parallel with the stem 80, there being an aperture 89 formed through the head 81 for said pin to slide in, said aperture being located as shown in Figs. 7 and 8. The upper end of pin 88 is reduced in size and formed oval to engage the wire as hereinafter set forth. The pin 88 allows the head 81 to move up and down but it prevents it from rotating.

Secured on shaft 7 are a plurality of cam-wheels 90, corresponding in number to the intermediate line-wires.

Carried by the rear point of each cam-arm 67 is a roller 91 which revolves in the channel of the respective cam-wheel 90 and thereby moves the forward end of the cam-arm 67 up and down a predetermined amount for the purposes hereinafter made plain.

Pivoted near its center to the stationary finger 98, which extends down and forward from the block 78 with which it is integral, is the dog 99. The forward end of said dog is adapted to engage the under face of the pinion 83, to one side of its center, and to raise it up and down at predetermined intervals. The rear end of the dog 99 is adjustably pivoted to the forward end-portion of the arm 67 by the link 100. From the above it will be seen that as the arm 67 is rocked by the cam 90, the dog 99 will at certain intervals press upward thereby raising the pinion 83, the stem 80, and the head 81, to the position shown in Fig. 5, and immediately thereafter allowing said parts to drop back by gravity to the position indicated by dotted lines in said views. Pivoted to the upper portion of the finger 98 is a foot 101. The forward end portion of the said foot is pivotedly connected to the rear end of the arm 67 by means of the link 102. A flat portion of the foot 101 is adapted to cover the top of the head 81, and by means of the construction just described it is apparent that said foot will be raised and lowered alternately to and from said head. A slot *a* is formed in said flat portion of the foot to register with the aperture 89, in order that the foot may not be in the way of the line wire passing upward, the foot thereby being adapted to stride the line wire. Also a toe *b* extends back from the foot 101, the same being located to one side of the center of the head, as indicated, and being for the purpose hereinafter made apparent.

Carried by the upper portions of the blocks 78 and held by them in front of the bed-plate 4, is the tracker-bar, which consists essentially of two plates 92 and 93 which extend across all of the twisters, immediately above and to the rear of the center of the faces of the heads thereof. The upper edges of the plates 92 and 93 are loosely hinged together by the ties 94. Plate 92 is rigidly secured to the bed-plate 4 by means of a plurality of bolts 95, each passing through a large hole therefor in plate 93 whereby it will not engage therewith, the latter plate being adapted to swing. Numeral 96 denotes tension bolts, each passing through the bed-plate, the same having a reduced forward portion around which is coiled a helical spring 97 whose forward end presses against plate 93 and normally retains plate 93 resiliently in contact with plate 92. The lower edge of plate 92 is beveled and a channel *e* is formed along in said bevel, the same extending from end-to-end of the tracker-bar. A ridge *f* projects along the lower edge of the plate 93, the side of said ridge being such as to fit the space cut away by the beveled portion of the plate 92 so that the two plates will fit together, and when they are brought together the ridge *f* will close the channel *e* and make it a complete tube or barrel extending the full length of the tracker-bar. Opposite each foot 101 a notch *h* is formed in the lower edge of the tracker-bar in which may enter the toe *b* of the respective feet.

Secured to the face of the bed-plate 4, near the left end thereof, is the guide-barrel 103 through which the stay-wire A is shot from beneath the smooth contact faces of the wheels 32 and 33, the wire A entering the nipple 104 through which it passes through the block 105, passing under the cutter 106, and then enters the channel *e*, by which latter it is guided through the entire length of the tracker-bar. After being driven through the channel *e* the projecting end of the wire A at the right will be twisted around the outside line wire B by the right-hand marginal twister. Pivoted to the right-hand side of the block 105 is the cutter 106, which is adapted to cut the wire A at the proper time and place, after which the left-hand end of the stay just formed will be twisted around the left-hand marginal line wire L. The cutter 106 is operated by the link 107 by which it is connected to the forward end of one of the cam-arms 67, as shown in Fig. 3. The said cutter is retained, normally, away from interference with the insertion of the stay-wire A by means of the spring 108.

Returning now to the bulldozer: The fixed cam 21 is in the nature of a disk, as shown in Fig. 10, the shaft 43 passing through it and it has arms extending to the right by which it may be rigidly secured over the top of member 1, that is to the boxing 5 as shown in Fig. 1. The cam 21 has two flanges for the rollers 50 to engage with, one of said flanges being adapted to force the rollers to the left and the other to the right, for purposes hereinafter stated. For each of the line-wires to be passed up over the bulldozer there is a set of three pins *n*, *o*, and *p*, projecting out from each set of bars 47, 48 and 49. From this it is apparent that if the bar 48 be located to the right to its limit of movement, that a line wire passing over the bulldozer may rest between pins *n—p* and *o*, as shown at the lower portion of the bulldozer in Fig. 1, then when the roller 50 engages one portion of the cam 21 it will be forced to the left, thereby causing the pin *o* to engage the line wire, pressing it tightly against pins *n* and *p*, thereby gripping the wire and incidentally crimping the same, holding it with such force that as the bulldozer revolves the line wire will be drawn upward. After the bulldozer has turned a certain amount then other of the bars 48 will be operated in like manner, the one just described then being released and moved to the right, these operations following each other continuously, the line-wire being alternately engaged and released, whereby the continuous revolution of the bulldozer will cause the line-wire (or the finished product) to be advanced upward at a continuous rate of speed.

The reel mechanism referred to above, for spooling the finished fence as it comes from the bulldozer, extends across between the rear projections of the members 1 and 2, and is operated by the sprocket chains 60 and 61. The construction of the reel as herein used is fully described and shown in a prior patent issued to me on May 24, 1910, No. 958,888.

Extending across between the end members 1 and 2, and supported by hangers 109 and 110, the latter being secured to the cross member 3, is the shaft 112. Mounted on the last mentioned shaft are a plurality of spools 113, one for each line-wire, and from around which the line wires are drawn from their sources of supply located forward of the machine.

The right-hand foot 101, in connection with line-wire B, in place of being operated by a cam-wheel 90 as are the others, is connected by a cross-bar 114 to the foot next thereto to the left thereof, as shown clearly in Fig. 4, and it of course operates therewith. In like manner the left-hand foot 101, in connection with line-wire L, in place of being operated by a cam-wheel 90, as are all the intermediate feet, is connected by a cross-bar 115 to the foot next thereto to the right thereof, as shown in Fig. 12, whereby the left-hand cam wheel 90 operates only the knife or cut-off.

As is apparent in Fig. 12 the cam-wheels 90 are arranged so that the point of each is advanced slightly more than the one next thereto to the left, thereby timing the twister to operate progressively beginning to the right and ending at the left. Now in certain instances I may arrange the cam-wheels as in Fig. 13, wherein the points of the two center wheels are further advanced than the others, and from them the points are graduated so that the twisters will operate first in the center and then progressively both to the right and the left at the same time.

*Modus operandi:* In practise the various parts and devices are precisely timed whereby the several operations are performed each at its proper moment and in proper relation to all the other parts, so that all combine to a unitary result. All of the operations follow each other in complete cycles, therefore no definite movement can be given as the first or the finish, but perhaps it will be well to suppose that all of the feet 101 are up, which is the case at one instant in the cycle, at which time the wheels 32 and 33 will engage the wire A and drive it endwise through the channel *e* of the tracker-bar. The wire A will then be released, following which the cam wheels 90 will operate the cam-arms 67, progressively one at a time from right to left. The toe *b* of the feet will enter the notches *h* and engage the wire A which is then in channel *e* and force it downward therefrom to engagement with the heads 81,—first the one on the right and then the others in quick succession. As the wire A is pressed down upon a head 81 the point of the pin 88 projecting above its head will of course engage the wire A and form a loop therein, and then as the head is revolving it is manifest that the said loop will be carried around the line wire, wire D for instance, at the same time the head 81 will be raised upward, as in Fig. 8, thereby forcing said loop into cavity 87 and withdrawing the pin 88 from the loop. The shape of the cavity 87 and its relative position to the channel 82 is such that the turning of the head 81 will twist the loop, just formed, around the line-wire thereby forming a tie such as shown in Fig. 9. As soon as the tie is formed the bulldozer pulling on the line-wires will carry the tie just formed out of cavity 87 and the head will be brought back ready for a new tie to be formed thereby. In practice the right-hand end of wire A is first twisted around wire B by the right-hand marginal twister, and the ties are then formed in rapid succession on wires C, D, E, F, G, H, I, J and K. Following the latter the cutter 106 will sever the left-hand end of wire A from its supply and then the left-hand marginal twister will twist the left-hand end of wire A around wire L, thereby completing that stay-wire.

Having now fully shown and described my invention and the best means for its construction to me known at this time, what I claim and desire to secure by Letters Patent of the United States, is—

1. In a wire-fence machine, the combination of a frame, a bed-plate extending across the front of the frame, a plurality of vertically disposed and horizontally revoluble twisters located in front of the bed-plate, a twister-block for each of said twisters, said twister blocks being secured to the bed-plate, means for operating all of said twisters continuously in one direction, a tracker-bar disposed along above said twisters and connected by said twister blocks to the bed-plate, means for shooting a stay-wire through the tracker-bar, and means for removing the stay-wire from the tracker bar and bringing it to position to be engaged by the twisters, all substantially as shown and described.

2. In a wire-fence machine, the combination of a frame, a bed-plate extending across the forward part of the frame, a plurality of vertically disposed twisters, a twister-block for each twister, the twister-blocks being secured to the face of the bed-plate, means for revolving all of the twisters continuously in one direction, a tracker-bar carried by the bed-plate and extending along above all of the twisters, means for shooting stay-wires through said tracker-bar, means for removing the stay-wires from the tracker-bar and bringing them to position to be engaged by the twisters, and means for causing the twisters to successively engage the stay-wires and to form ties therewith around each of the line wires, all substantially as shown and described.

3. In a wire-fence machine, the combination with a suitable frame having a bed-plate disposed horizontally thereacross, a plurality of twister-blocks secured along to the face of the bed-plate, a twister carried by each twister-block, each of the intermediate twisters being mounted to revolve horizontally, means for revolving all of the twisters continuously in one direction, a tracker-bar also carried by said twister-blocks and extending along above each of said twisters, said tracker-bar being composed of two plates, one of which is movable with relation to the other, there being a channel located between said plates and extending from end to end thereof, means for shooting stay-wires through said channel, means for removing the stay-wire from said channel and bringing it into contact with the several twister heads successively, means for severing the stay-wires, and means for advancing the finished product and the line-wires, substantially as set forth.

4. A wire fence machine including with a suitable frame, a bed-plate extending across the front of the frame, a plurality of vertical twisters carried by the bed-plate, a cam-arm for raising and lowering each intermediate twister, a foot operated by each cam-arm for bringing the stay-wire to position to be engaged by the twisters, a tracker-bar for guiding the stay-wire across the twisters, means for shooting the stay wires through said tracker bar, a shaft extending across the machine, a cam-wheel for each twister, all of said cam wheels being mounted on said shaft but each being timed differently from the others, means for operating said shaft and the twisters by power, and means for advancing the finished product, all substantially as shown and described.

5. A wire fence machine comprising in combination a suitable frame, a bed-plate extending across the frame, twister-blocks carried by the bed-plate, a vertically disposed twister revolubly mounted in each twister block, a twister shaft extending across below the bed plate, gears connecting each of the twisters to said shaft, a cam shaft extending across longitudinally of the machine, cam-wheels secured on the cam-shaft cam-arms connecting said cam wheels to the respective twisters, a tracker-bar disposed across in front of the bed-plate, means for shooting stay-wires through said tracker-bar, means for automatically withdrawing the stay-wires from the tracker-bar and bringing them to position to be engaged by the twisters, means for severing the stay-wire, and means for advancing the line wires, all substantially as shown and described.

6. In a wire fence machine having a plurality of twisters disposed vertically, a twister-shaft, gears connected to said shaft for operating said twisters continuously in one direction, a cam-shaft, cam-wheels secured on said cam-shaft, a fixed shaft, cam-arms pivoted on said fixed shaft and each having connection with one of said cam-wheels and each adapted to raise one of said twisters at each revolution of the cam-wheels, means connected with each of said cam-arms for engaging a stay-wire and bringing it down into engagement with its respective twister, and means for delivering the stay-wires to position above the twisters, all substantially as shown and described.

7. In a wire-fence machine, a plurality of vertically disposed twisters, a twister shaft, gears connecting the twister-shaft to the twisters whereby the twisters will operate continuously in one direction, a cam-shaft, cam wheels secured on the cam shaft, a fixed shaft, cam arms pivoted on the fixed shaft and each being adapted to be operated by one of said cam-wheels and each being adapted to raise one of the twisters at each revolution of the cam-wheel, a tracker-bar extending along over all of the twisters, means for shooting stay-wires through said tracker-bar, means connected to each of said cam-arms for taking the stay-wire from the tracker-bar and delivering it to position to be engaged by said twisters, all substantially as shown and described.

8. In an automatic wire-fence weaving machine, a supporting-frame having a horizontal bed-plate, a series of vertically disposed twisters disposed along in front of the bed-plate for forming loops in the stay-wire and for twisting said loops around the line wires at each intersection of the line wire and the stay-wire, a tracker-bar through which the stay-wire may pass endwise, means for shooting the stay-wire, means for taking the stay-wire from the tracker-bar as required and delivering it to the twisters, means for advancing the line-wires continuously, and means for forming the finished product into rolls, all substantially as shown and described.

In testimony whereof I have hereunto subscribed my name to this specification in the presence of two subscribing witnesses.

WILLIAM N. PARRISH.

Witnesses:
ROBT. W. RANDLE,
R. E. RANDLE.

---

Copies of this patent may be obtained for five cents each, by addressing the "Commissioner of Patents, Washington, D. C."